US009569210B2

(12) United States Patent
Wolrich et al.

(10) Patent No.: US 9,569,210 B2
(45) Date of Patent: *Feb. 14, 2017

(54) APPARATUS AND METHOD OF EXECUTION UNIT FOR CALCULATING MULTIPLE ROUNDS OF A SKEIN HASHING ALGORITHM

(71) Applicant: Intel Corporation, Santa Clara, CA (US)

(72) Inventors: Gilbert M. Wolrich, Framingham, MA (US); Kirk S. Yap, Westborough, MA (US); James D. Guilford, Northborough, MA (US); Erdinc Ozturk, Hillsboro, OR (US); Vinodh Gopal, Westborough, MA (US); Wajdi K. Feghali, Boston, MA (US); Sean M. Gulley, Boston, MA (US); Martin G. Dixon, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,610

(22) Filed: Jul. 6, 2016

(65) Prior Publication Data

US 2016/0313993 A1    Oct. 27, 2016

Related U.S. Application Data

(63) Continuation of application No. 13/997,186, filed as application No. PCT/US2011/066988 on Dec. 22, 2011, now Pat. No. 9,405,537.

(51) Int. Cl.
*G06F 9/30*    (2006.01)
*G06F 9/38*    (2006.01)
*H04L 9/06*    (2006.01)

(52) U.S. Cl.
CPC ....... *G06F 9/30029* (2013.01); *G06F 9/30018* (2013.01); *G06F 9/30036* (2013.01); *G06F 9/3885* (2013.01); *H04L 9/0643* (2013.01)

(58) Field of Classification Search
None
See application file for complete search history.

(56) References Cited

U.S. PATENT DOCUMENTS 7,242,766 B1    7/2007 Lyle
8,000,469 B2 *  8/2011 Buer ................. H04L 9/0643
                                                380/29
(Continued)

FOREIGN PATENT DOCUMENTS

CN    1390324 A    1/2003
CN    1983162 A    6/2007
(Continued)

OTHER PUBLICATIONS

"The Skein Hash Function Family", v 1.1, Nov. 2008, Microsoft.*
(Continued)

*Primary Examiner* — Dede Zecher
*Assistant Examiner* — Richard McCoy
(74) *Attorney, Agent, or Firm* — Nicholson De Vos Webster & Elliott, LLP

(57) ABSTRACT

An apparatus is described that includes an execution unit within an instruction pipeline. The execution unit has multiple stages of a circuit that includes a) and b) as follows: a) a first logic circuitry section having multiple mix logic sections each having: i) a first input to receive a first quad word and a second input to receive a second quad word; ii) an adder having a pair of inputs that are respectively coupled to the first and second inputs; iii) a rotator having a respective input coupled to the second input; iv) an XOR gate having a first input coupled to an output of the adder and a (Continued)

second input coupled to an output of the rotator. b) permute logic circuitry having inputs coupled to the respective adder and XOR gate outputs of the multiple mix logic sections.

21 Claims, 20 Drawing Sheets

(56) References Cited

U.S. PATENT DOCUMENTS

| | | | |
|---|---|---|---|
| 8,855,302 B2* | 10/2014 | Sheikh | H04L 9/0618 380/2 |
| 2009/0138534 A1* | 5/2009 | Lee | G06F 7/762 708/209 |
| 2010/0114923 A1 | 5/2010 | Mcvady et al. | |
| 2011/0138192 A1 | 6/2011 | Kocher et al. | |
| 2011/0225429 A1 | 9/2011 | Papamanthou et al. | |

FOREIGN PATENT DOCUMENTS

| | | |
|---|---|---|
| CN | 101553808 A | 10/2009 |
| TW | 589820 B | 6/2004 |
| WO | 2010024931 A1 | 3/2010 |

OTHER PUBLICATIONS

Ferguson et al., "The Skein Hash Function Family Version 1.3", Oct. 1, 2010, 100 pages.
Ferguson et al., "The Skein Hash Function Family Version 1.1", Nov. 15, 2008, 79 pages.
Office action and Search Report with English translation from Taiwan Patent Application No. 101147871, mailed Oct. 20, 2015, 12 pages.
Ferguson et al., "The Skein Hash Function Family Version 1.2", Sep. 15, 2009, 92 pages.
PCT/US2011/066988 Notification of Transmittal of the International Search Report and the Written Opinion of the International Searching Authority, mailed Sep. 24, 2012, 10 pages.
Office action and Search Report with English translation from Taiwan Patent Application No. 101147871, mailed Aug. 26, 2014, 19 pages.
PCT/US2011/066988 Notification Concerning Transmittal of International Preliminary Report on Patentability, mailed Jul. 3, 2014, 8 pages.
Office action with English translation from Chinese Patent Application No. 201180076287.0, mailed Mar. 2, 2016, 17 pages.
Office action with English translation from Chinese Patent Application No. 201180076287.0, mailed Aug. 15, 2016, 22 pages.

* cited by examiner

SKEIN 512 PERMUTE

ROTATION AMOUNT FOR SKEIN 512
MIX FUNCTION

| POSITION OF QUAD WORD IN 512 BIT INTERNAL ST. | | 1 | 2 | 3 | 4 | 5 | 6 | 7 | 8 |
|---|---|---|---|---|---|---|---|---|---|
| ROUND # | 1 | 55 | 43 | 37 | 40 | 16 | 22 | 38 | 12 |
| | 2 | 25 | 25 | 46 | 13 | 14 | 13 | 52 | 57 |
| | 3 | 33 | 8 | 18 | 57 | 21 | 12 | 32 | 54 |
| | 4 | 34 | 43 | 25 | 60 | 44 | 9 | 59 | 34 |
| | 5 | 28 | 7 | 47 | 48 | 51 | 9 | 35 | 41 |
| | 6 | 17 | 6 | 18 | 25 | 43 | 42 | 40 | 15 |
| | 7 | 58 | 7 | 32 | 45 | 19 | 18 | 2 | 56 |
| | 8 | 47 | 49 | 27 | 58 | 37 | 48 | 53 | 56 |

(TABLE REPEATS FOR ROUND # MODULO 8)

FIG. 3D

| | | | TIME ↓ |
|---|---|---|---|
| INSTRUCTION PHASE 1 701 | READ CONTENT FROM R1 INTO REG 801 | READ CONTENT FROM R2 INTO REG 802 | |
| INSTRUCTION PHASE 2 702 | PRESENT CONTENT FROM REG 501 TO LOGIC SECTION 803a AND 803b; PERMUTE MIX RESULTS INTO REGS 811, 812 | PRESENT CONTENT FROM REG 802 TO LOGIC SECTION 803a AND 803b; PERMUTE MIX RESULTS INTO REGS 811, 812 | ROUND 1 |
| INSTRUCTION PHASE 3 703 | PRESENT CONTENT FROM REG 811 TO LOGIC SECTION 803a AND 803b; PERMUTE MIX RESULTS INTO REGS 811, 812 | PRESENT CONTENT FROM REG 812 TO LOGIC SECTION 803a AND 803b; PERMUTE MIX RESULTS INTO REGS 811, 812 | ROUND 2 |
| INSTRUCTION PHASE 4 704 | [SAME AS INSTRUCTION PHASE 3] | | ROUND 3 |
| INSTRUCTION PHASE 5 705 | [SAME AS INSTRUCTION PHASE 3] | | ROUND 4 |
| INSTRUCTION PHASE 6 706 | WRITE CONTENTS OF REG. 811 OR 812 FOR R3 | | |

FIG. 7A

| | | |
|---|---|---|
| INSTRUCTION PHASE 1 | READ CONTENT FROM R1 INTO REG_1   READ CONTENT FROM R2 INTO REG_2 | |
| INSTRUCTION PHASE 2 | PRESENT CONTENT FROM REG_1 TO MIX A,B AND FROM REG_2 TO MIX C,D<br><br>PERMUTE MIX RESULTS INTO REG_1 AND REG_2 | ROUND 1 |
| INSTRUCTION PHASE 3 | [SAME AS INSTRUCTION PHASE 2] | ROUND 2 |
| INSTRUCTION PHASE 4 | [SAME AS INSTRUCTION PHASE 2] | ROUND 3 |
| INSTRUCTION PHASE 5 | [SAME AS INSTRUCTION PHASE 2] | ROUND 4 |
| INSTRUCTION PHASE 6 | WRITE CONTENTS OF REG_1 OR REG_2 FOR R3 [SAME AS INSTRUCTION PH | |

FIG. 7B

| | |
|---|---|
| INSTRUCTION PHASE 1 | READ CONTENT FROM R1 INTO REG_1 |
| INSTRUCTION PHASE 2 | PRESENT CONTENT FROM REG_1 TO MIX A,B,C,D PERMUTE MIX RESULTS INTO REG_1 |
| INSTRUCTION PHASE 3 | [SAME AS INSTRUCTION PHASE 2] |
| INSTRUCTION PHASE 4 | [SAME AS INSTRUCTION PHASE 2] |
| INSTRUCTION PHASE 5 | [SAME AS INSTRUCTION PHASE 2] |
| INSTRUCTION PHASE 6 | WRITE CONTENTS OF REG_1 FOR R2 [DEST] |

FIG. 7C

| CYCLE | | |
|---|---|---|
| 1 | START SKEIN_512 R2; R1 | (R1 = 512 BIT INPUT OPERAND) |
| 2 | [SKEIN_512 R2;R1 CONTINUES] | |
| 3 | [SKEIN_512 R2;R1 COMPLETES] | (RESULT IN R2) |
| 4 | ADD R1; R2; R3 | (RESULT IN R1; SUBKEY IN R3) |

FIG. 9C

APPARATUS AND METHOD OF EXECUTION UNIT FOR CALCULATING MULTIPLE ROUNDS OF A SKEIN HASHING ALGORITHM

CROSS REFERENCE TO RELATED APPLICATIONS

The present patent application is a continuation application claiming priority from U.S. patent application Ser. No. 13/997,186, filed Jun. 21, 2013, and titled: "Apparatus and Method of Execution Unit for Calculating Multiple Rounds of a Skein Hashing Algorithm", which is a U.S. National Phase Application under 35 U.S.C. §371 of International Application No. PCT/US2011/066988, filed Dec. 22, 2011, and titled: "Apparatus and Method of Execution Unit for Calculating Multiple Rounds of a Skein Hashing Algorithm", both of which are incorporated herein by reference in their entirety.

BACKGROUND

Field of Invention

The present invention pertains to the computing sciences generally, and, more specifically to an apparatus and method of an execution unit for calculating multiple rounds of a Skein hashing algorithm Background FIG. 1 shows a high level diagram of a processing core 100 implemented with logic circuitry on a semiconductor chip. The processing core includes a pipeline 101. The pipeline consists of multiple stages each designed to perform a specific step in the multi-step process needed to fully execute a program code instruction. These typically include at least: 1) instruction fetch and decode; 2) data fetch; 3) execution; 4) write-back. The execution stage performs a specific operation identified by an instruction that was fetched and decoded in prior stage(s) (e.g., in step 1) above) upon data identified by the same instruction and fetched in another prior stage (e.g., step 2) above). The data that is operated upon is typically fetched from (general purpose) register storage space 102. New data that is created at the completion of the operation is also typically "written back" to register storage space (e.g., at stage 4) above).

The logic circuitry associated with the execution stage is typically composed of multiple "execution units" or "functional units" 103_1 to 103_N that are each designed to perform its own unique subset of operations (e.g., a first functional unit performs integer math operations, a second functional unit performs floating point instructions, a third functional unit performs load/store operations from/to cache/memory, etc.). The collection of all operations performed by all the functional units corresponds to the "instruction set" supported by the processing core 100.

Two types of processor architectures are widely recognized in the field of computer science: "scalar" and "vector". A scalar processor is designed to execute instructions that perform operations on a single set of data, whereas, a vector processor is designed to execute instructions that perform operations on multiple sets of data. FIGS. 2A and 2B present a comparative example that demonstrates the basic difference between a scalar processor and a vector processor.

FIG. 2A shows an example of a scalar AND instruction in which a single operand set, A and B, are ANDed together to produce a singular (or "scalar") result C (i.e., AB=C). By contrast, FIG. 2B shows an example of a vector AND instruction in which two operand sets, A/B and D/E, are respectively ANDed together in parallel to simultaneously produce a vector result C, F (i.e., A.AND.B=C and D.AND.E=F). As a matter of terminology, a "vector" is a data element having multiple "elements". For example, a vector V=Q, R, S, T, U has five different elements: Q, R, S, T and U. The "size" of the exemplary vector V is five (because it has five elements).

FIG. 1 also shows the presence of vector register space 104 that is different that general purpose register space 102. Specifically, general purpose register space 102 is nominally used to store scalar values. As such, when, the any of execution units perform scalar operations they nominally use operands called from (and write results back to) general purpose register storage space 102. By contrast, when any of the execution units perform vector operations they nominally use operands called from (and write results back to) vector register space 107. Different regions of memory may likewise be allocated for the storage of scalar values and vector values.

Note also the presence of masking logic 104_1 to 104_N and 105_1 to 105_N at the respective inputs to and outputs from the functional units 103_1 to 103_N. In various implementations, only one of these layers is actually implemented—although that is not a strict requirement. For any instruction that employs masking, input masking logic 104_1 to 104_N and/or output masking logic 105_1 to 105_N may be used to control which elements are effectively operated on for the vector instruction. Here, a mask vector is read from a mask register space 106 (e.g., along with input data vectors read from vector register storage space 107) and is presented to at least one of the masking logic 104, 105 layers.

Over the course of executing vector program code each vector instruction need not require a full data word. For example, the input vectors for some instructions may only be 8 elements, the input vectors for other instructions may be 16 elements, the input vectors for other instructions may be 32 elements, etc. Masking layers 104/105 are therefore used to identify a set of elements of a full vector data word that apply for a particular instruction so as to effect different vector sizes across instructions. Typically, for each vector instruction, a specific mask pattern kept in mask register space 106 is called out by the instruction, fetched from mask register space and provided to either or both of the mask layers 104/105 to "enable" the correct set of elements for the particular vector operation.

FIGS. 3a through 3d pertain to a Skein hashing algorithm. FIG. 3a shows an exemplary high level processing flow of a Skein hashing algorithm 300. Typically, the Skein hashing algorithm is performed on pairs of 64 bit data chunks. Each 64 bit data chunk can be referred to as a "quadword". In the exemplary high level processing flow of FIG. 3a, inputs 301a through 301h correspond to respective quadwords. That is, a first quadword is presented at input 301a, a second quadword is presented at input 301b, etc.

In the case of Skein-256, 256 input bits (4 input quadwords) are presented to the hashing algorithm. In the case of Skein 512, input 512 bits (8 input quadwords) are presented to the hashing algorithm. In the case of Skein 1024, 1024 input bits (16 input quadwords) are presented to the hashing algorithm.

FIG. 3a shows an example of a Skein-512 algorithm. As observed in the example of FIG. 3a, a first "subkey addition" is performed 300 on the initial input quadwords 301a-h. A subkey addition is the addition of a numeric value equal in size to a value represented by the quadwords presented to it. For example, in the case of Skein_512, eight quadwords are used to construct a 512 bit value. As such, the subkey is also 512 bits and is added directly to the value represented by the eight quad words of internal state. The value of a subkey, and/or its method of calculation is readily available to those of ordinary skill and need not be discussed here.

According to the flow diagram of FIG. 3a, a "round" consists of a "mix" operational level 302 followed by a "permute" operational level 303. A single mix operation is performed on pairs of quadwords. As such, for Skein-512, four individual mix operations 302a through 302d are performed at the mix operational level 302 to build an internal state of 512 bits. The permute operation level 303 shuffles the outputs of the mix operations. An example of a Skein-512 permute pattern is observed in FIG. 3b (Skein-256 and Skein-1024 have their own permute patterns).

A sequence of four rounds 304a, 304b, 304c and 304d is followed by another subkey addition 305, and, the process of four rounds followed by a subkey addition repeats (e.g., 18 total times) until a preset total number of rounds is computed (e.g., 72 total rounds).

FIG. 3c shows a mix operation. As observed in FIG. 3c, a left input quadword 310a is added to a right input quadword 310b to produce a left output quadword 311a. The right input quadword 310b is also rotated 312. The left output 311a is XORed with the rotated right input quadword to produce a right output quadword 311b. The amount of rotation that is applied to the right input quadword 310b is a function of the specific round being executed and where the quadword resides in across the set of quadwords that make up the algorithm's internal state (e.g., 512 bit internal state for the Skein 512 algorithm). FIG. 3d shows an embodiment of a scheme used to determine the rotation.

BRIEF DESCRIPTION OF THE DRAWINGS

The present invention is illustrated by way of example and not limitation in the figures of the accompanying drawings, in which like references indicate similar elements and in which:

FIGS. 3a through 3d show aspects of a Skein hashing algorithm;

FIGS. 7a through 7c show methods executed by different execution units for calculating multiple rounds of a Skein hashing algorithm;

FIGS. 9a through 9c show different object code sequences for calculating a Skein hashing algorithm;

DETAILED DESCRIPTION

Overview

Figure 4A:
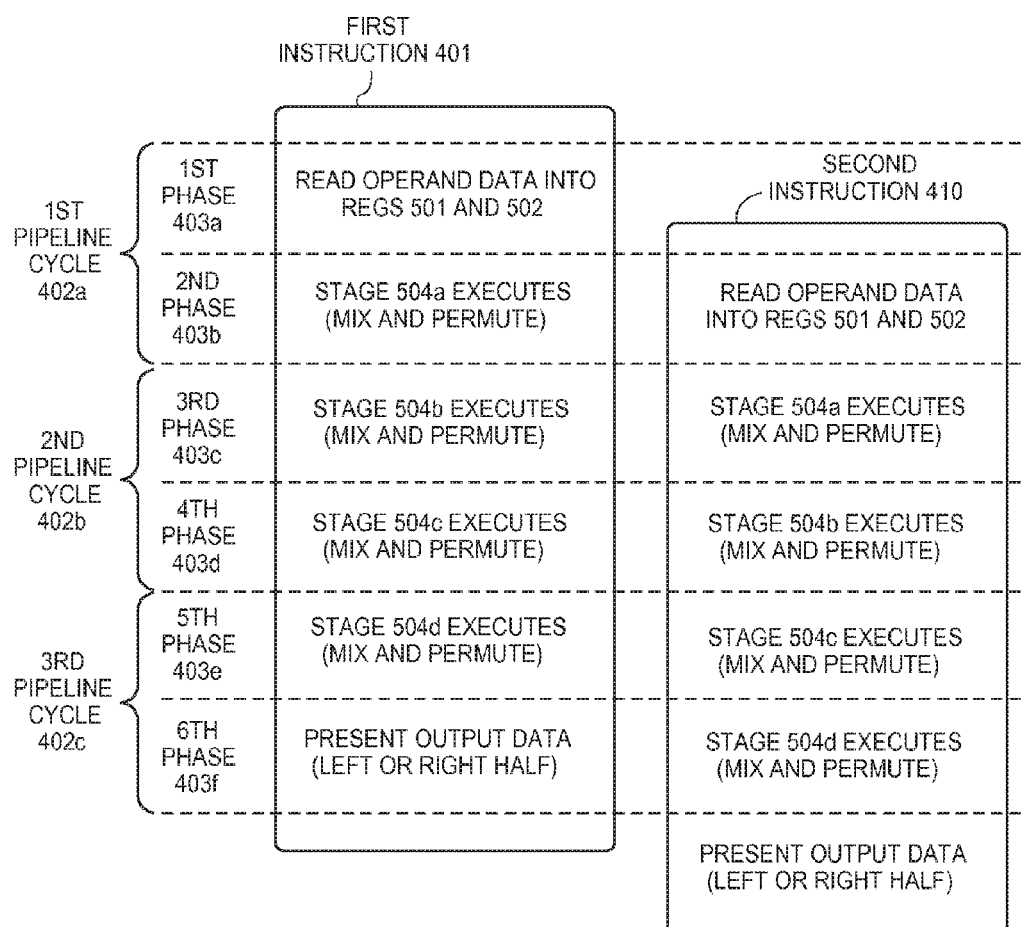
FIGS. 4a and 4b show methods executed by different execution units for calculating multiple rounds of a Skein hashing algorithm.
Figure 5A:
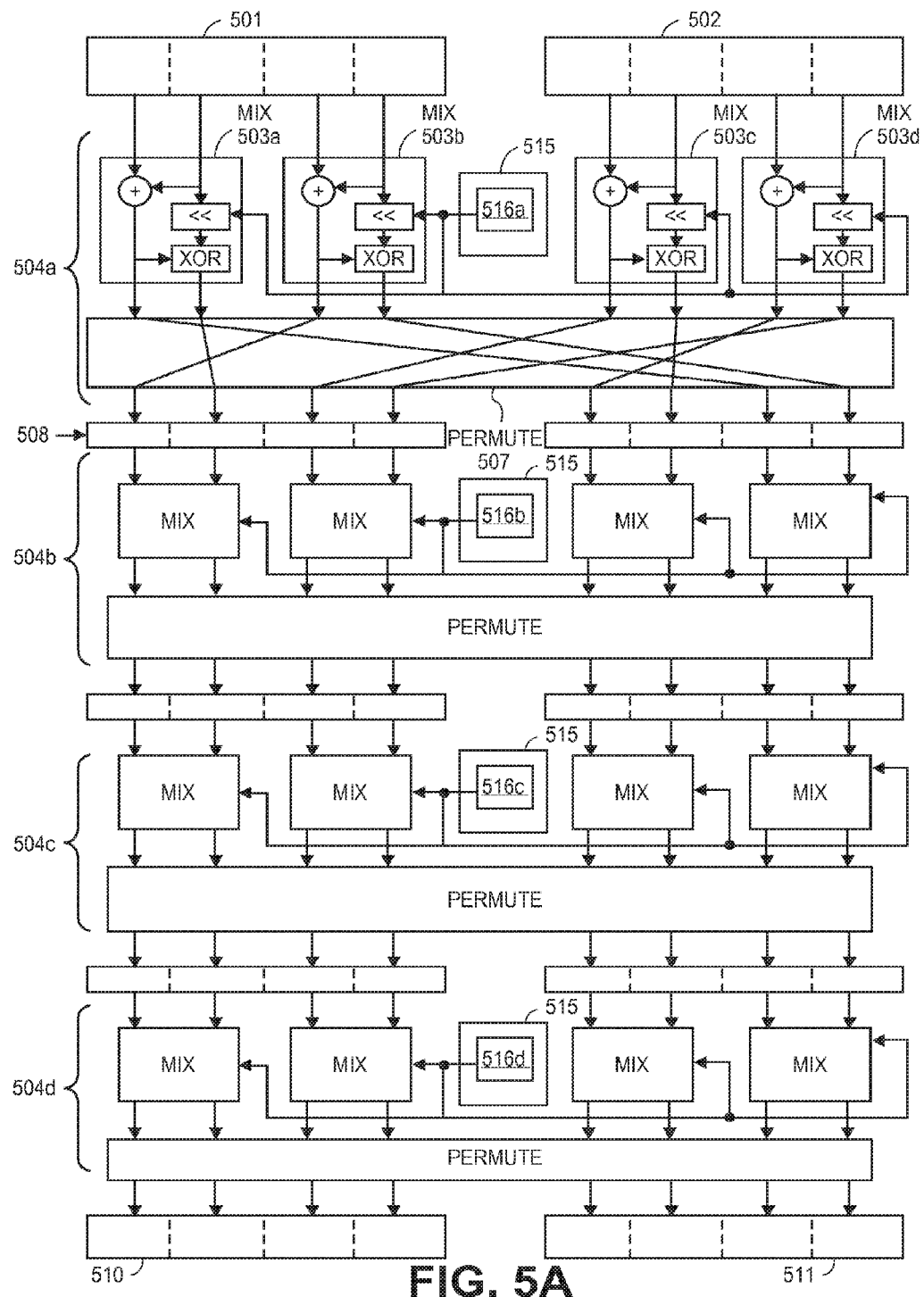
FIGS. 5a and 5b show different execution units for calculating multiple rounds of a Skein hashing algorithm.
Figure 6A:
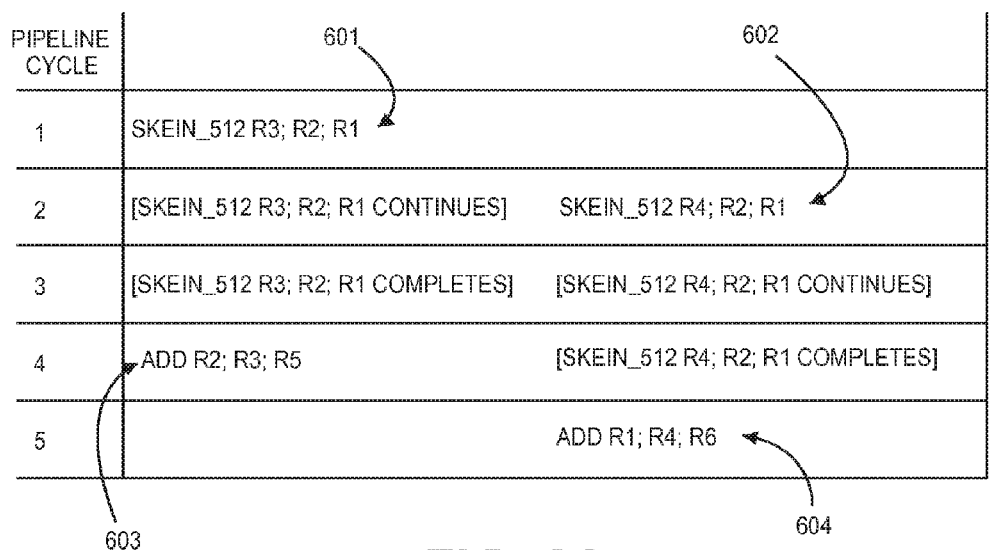
FIGS. 6a and 6b show different object code sequences for calculating a Skein hashing algorithm.

FIGS. 4a, 5a and 6c pertain to a first embodiment for a single instruction that can perform the calculations of four rounds of the Skein 512 hashing algorithm. FIG. 4a shows a sequence of operation of the instruction itself. FIG. 5a shows a logic design for the execution unit and FIG. 6a shows an object code representation.

Referring to FIGS. 4a and 5a, the datapath of the execution unit includes four stages 504a-504d of four parallel mix logic sections followed by a permute logic block. For example, stage 504a includes parallel mix logic sections 503a-503d followed by permute logic block 507.

FIG. 4a shows an embodiment of the operation of a single instruction 401. According to the process observed in FIG. 4a, the instruction is presumed to consume three instruction pipeline cycles, where, each instruction pipeline cycle can include two phases. Here, for instance, if the instruction pipeline cycles are marked by the rising edge of a clock, instruction phases are marked by the rising and falling edges of the same clock.

Accordingly, three instruction pipeline cycles 402a, 402b, 402c are observed in FIG. 4a with each instruction cycle having a pair of phases. Specifically, instruction pipeline cycle 402a has associated phases 403a,b; instruction pipeline cycle 402b has associated phases 403c,d; instruction pipeline cycle 402c has associated phases 403e,f. As such, the instruction consumes six phases in this particular embodiment. Those of ordinary skill will understand that other implementations may consume more or less phases or cycles.

Referring to FIGS. 4a and 5a, during the first phase 403a of instruction cycle 402a, input operand data is read into both registers 501 and 502. In the particular embodiment of FIG. 5a, registers 501 and 502 are each 256 bit registers. Fully populating both registers 501, 502 therefore sets up the datapath for the 512 bit internal state needed to calculate the Skein 512 algorithm.

During the second phase 403b of instruction cycle 402a, the input operand data is read from both registers 501 and 502 and is processed through the first stage 504a of the datapath. That is, a left half (two quad words=2×64=128 bits of data) of the contents of register 501 feed mix section logic 503a. More specifically, the leftmost quadword of register 501 feeds the left quadword input of mix logic 503a, and, the second to leftmost quad word of register 501 feeds the right quad word input of mix logic 503a. Also, the rightmost quad word of register 501 feeds the rightmost input of mix logic 503b and the second to rightmost quadword of register 501 feeds the leftmost input of mix logic 503b. Register 502 feeds mix logic sections 503c and 503d in a similar fashion.

Figure 1:
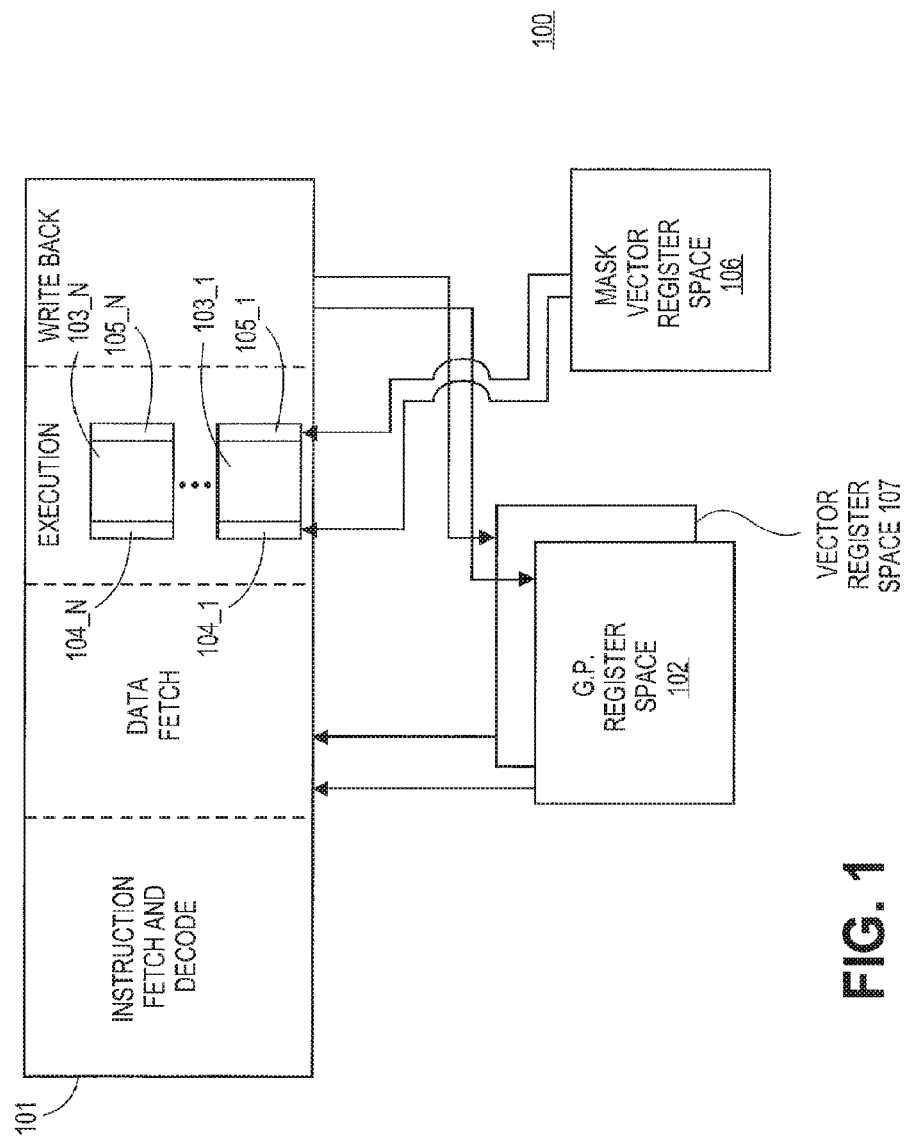
FIG. 1 shows an instruction execution pipeline.
Figure 2A:
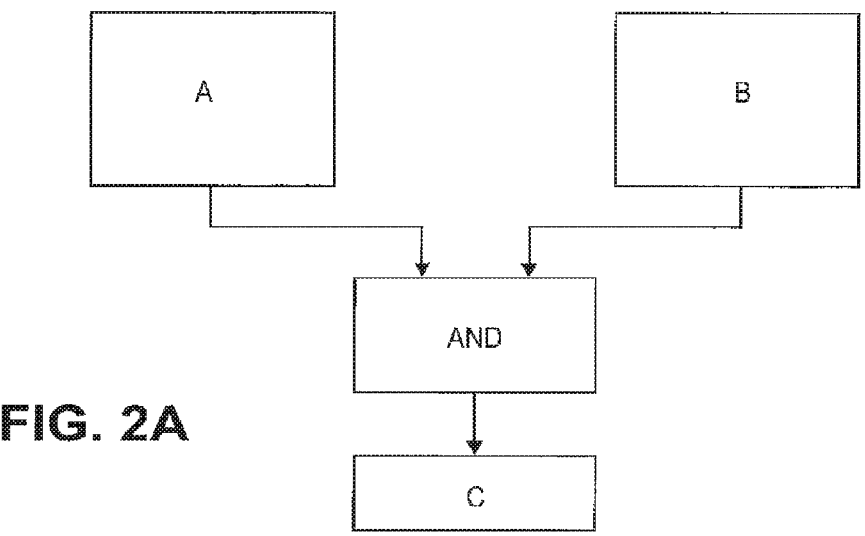
FIGS. 2a and 2b compare scalar vs. vector processing.
Figure 2B:
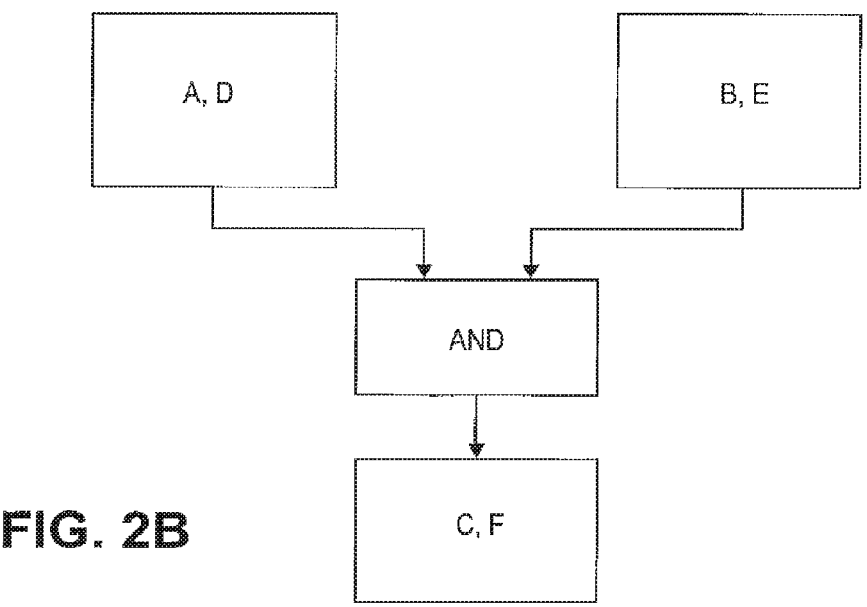
Figure 3A:
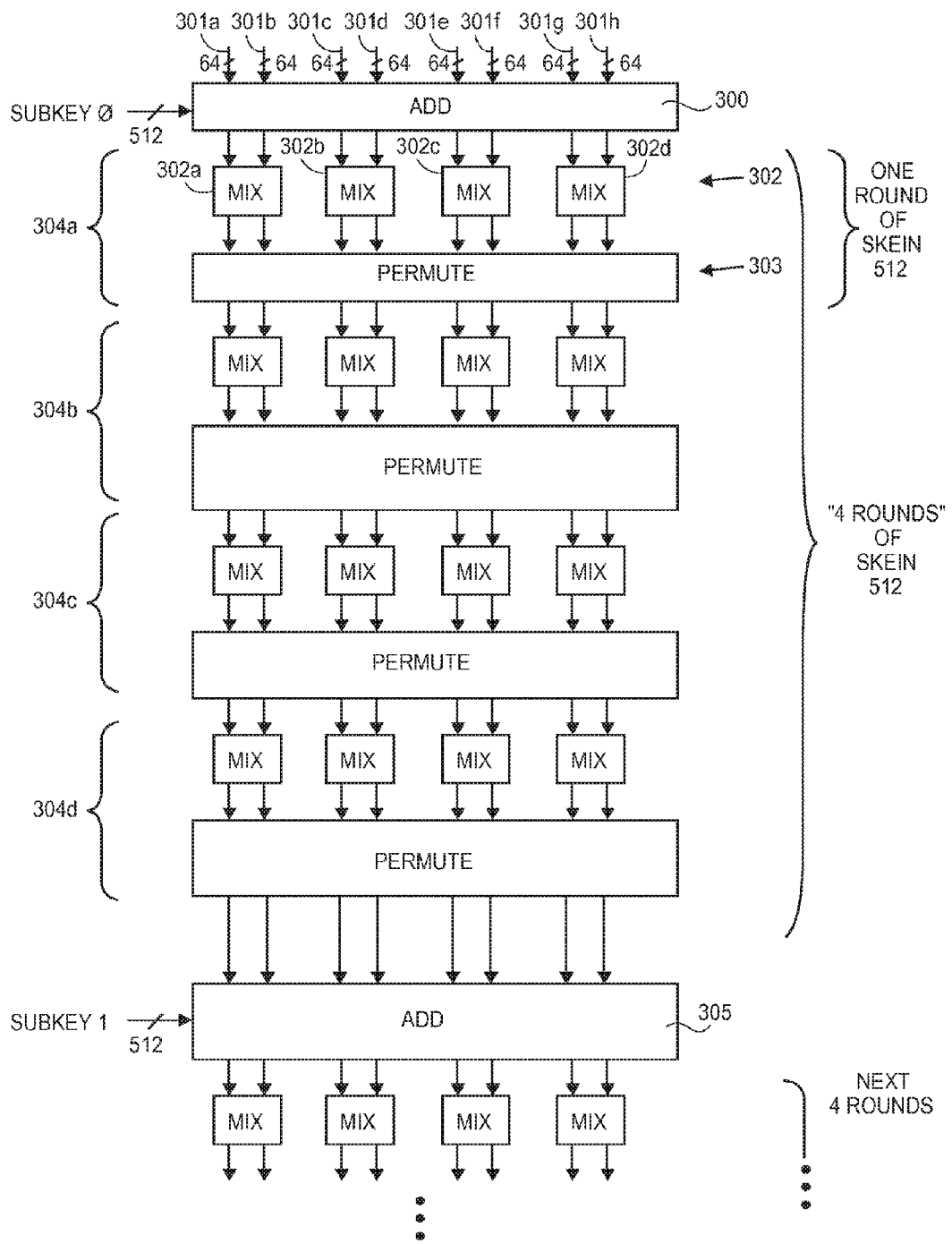
Figure 3B:
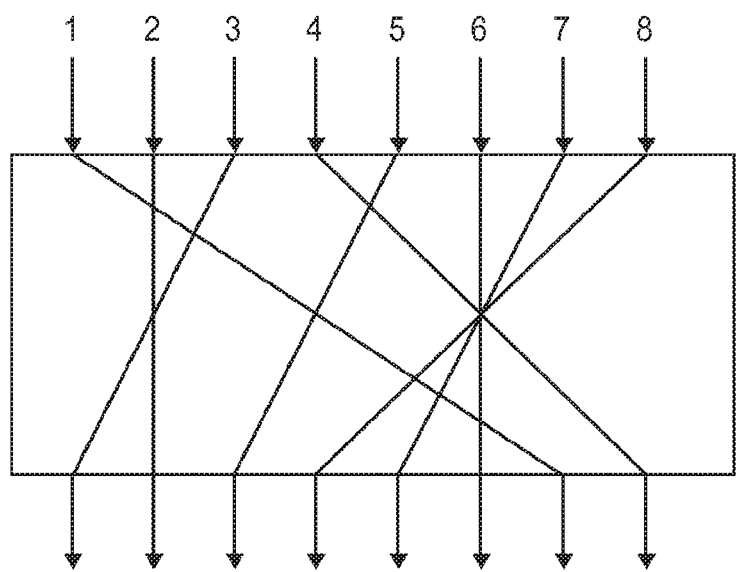
Figure 3C:
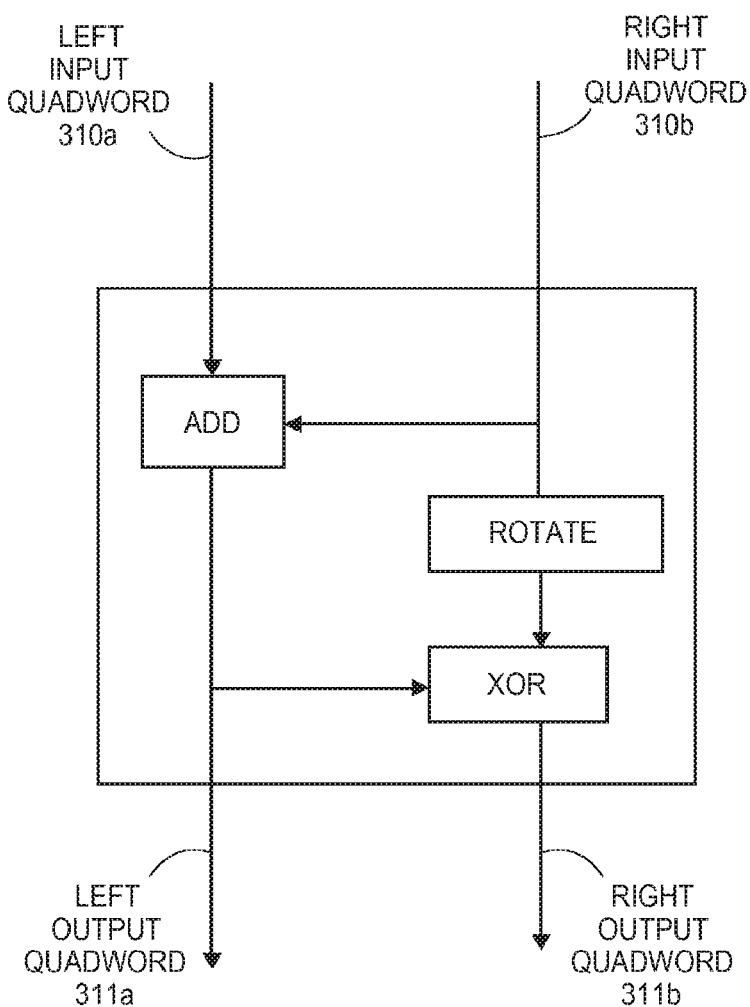

Each of mix logic sections 503a-503d contains respective adder, rotator and XOR logic circuitry consistent with the mix calculation of the Skein algorithm (see also, FIG. 3c). The permute logic 507 is designed to permute the eight quad words from the mix logic sections 503a-503d consistently with the Skein-512 algorithm (see, FIG. 3b).

As observed in FIG. 4a, during instruction phase 403b the data contents of registers 501 and 502 are: 1) presented to the mix logic sections 503a,b,c,d; 2) processed by the mix logic sections 503a,b,c,d; and, 3) permuted by the permute logic 507. Depending on implementation, the results of the permute may be latched at the end of instruction phase 403b into latches 508. Note that the computation of instruction phase 403b corresponds to the computation of one complete Skein 512 round.

In an embodiment, the execution is micro-coded and includes a read only memory (ROM) 515 that includes micro-code 516a,b,c,d that implements a table that includes the proper rotation control information for the rotator in each mix section logic and in each stage 504a,b,c,d. For Skein 512, as observed in FIG. 3d, rotator values are a function of the number of rounds modulo 8 (and the position of the quadword in the 512 bit internal state) Hence, the execution unit should be provided with information whether rounds 1 through 4 or 5 through 8 are being executed. In an embodiment this information is also specified in an immediate operand.

Instruction phases 403c through 403e proceed similarly, with a complete Skein 512 round being computed (and latched if desired) at the end of each such cycle in following stages 504b, 504c and 504d, respectively. At the end of instruction phase 403e, four rounds for the data that originally was read from registers 501 and 502 in instruction phase 403b have been fully computed and presented at the output of the permute logic of stage 504d. In the embodiment of FIG. 5a, the resultant from the permute logic of stage 504d is written into two separate latches 510, 511.

Latch 510 corresponds to the 256 bit "left half" of the 512 bit resultant of the four rounds of computation. Latch 511 corresponds to the 256 bit "right half" of the 512 bit result. In instruction phase 403f, the contents of one these 256 bit latches 510, 511 is provided as the resultant of the instruction. That is, the instruction is designed to provide one half of the 512 bit resultant. In an embodiment, whether the left half or right half is provided by the instruction is specified in an immediate operand that is included in the instruction format of the instruction.

The reason for the instruction's providing of only the left or right half is that the execution unit is designed to operate with "256 bit" register space that only keeps operands as large as 256 bits. As such, the destination register where the resultant is stored can only handle the left or right half of the final computation. In an embodiment the 256 bit register space is utilized in a manner where the four quad words per 256 bit operand are viewed as different elements of a vector of size (i.e., having an number of elements equal to) four.

Nevertheless, the multi-stage design of the execution unit permits the pipelining of consecutive instructions through the execution so that at the conclusion of two consecutive instructions issued to the execution unit the entire 512 bit computation is computed. That is, a first instruction provides one (e.g., the left) half and the second instruction provides the other (e.g., the right) half.

Examples are seen in FIG. 4a and FIG. 6a which shows an object code representation. Here, a first instruction 601 is issued to the execution unit whose immediate operand specifies one of the halves. The first instruction 601 is executed as described above for process 401 through pipeline cycles 402a,b,c. The second instruction 602 is issued to the execution unit in the next pipeline cycle 402b. The execution of instruction 602 is represented by process 410 of FIG. 4.

Noticeably process 410 follows the same process of the first instruction (process 401) but flows through the same stages at later instruction phases. For example, in instruction phase 403c, the third round is calculated for the first instruction in stage 504c, while, at the same time, the second round is calculated for the second instruction in stage 504b. As such, the two instructions are executed through the execution unit in a pipelined fashion. FIG. 6a also shows the execution of subsequent addition instructions 603, 604 that respectively add 256 bit left and 256 bit right half subkey values (kept in R5 and R6) to the results of the first and second instructions 601, 602 (stored in R3 and R4) to obtain the 512 bit internal state for four rounds through the addition of the subkey value. With the understanding that an initial subkey value (subkey 0) should be added to initial operand data, subsequent thereto, the "kernel" observed in FIG. 6a can be repeated/looped 18 times to fully calculate the Skein 512 hash. Notably, the add instructions 603, 604 write back to the initial operand locations R1 and R2. In repeating the loop of FIG. 6a, to the extend required by the Skein algorithm, new sub key values may be moved into R5 and R6. Such a move may be achieved with one or more move instructions (not shown in FIG. 6a) that are included in the kernel.

Figure 4B:
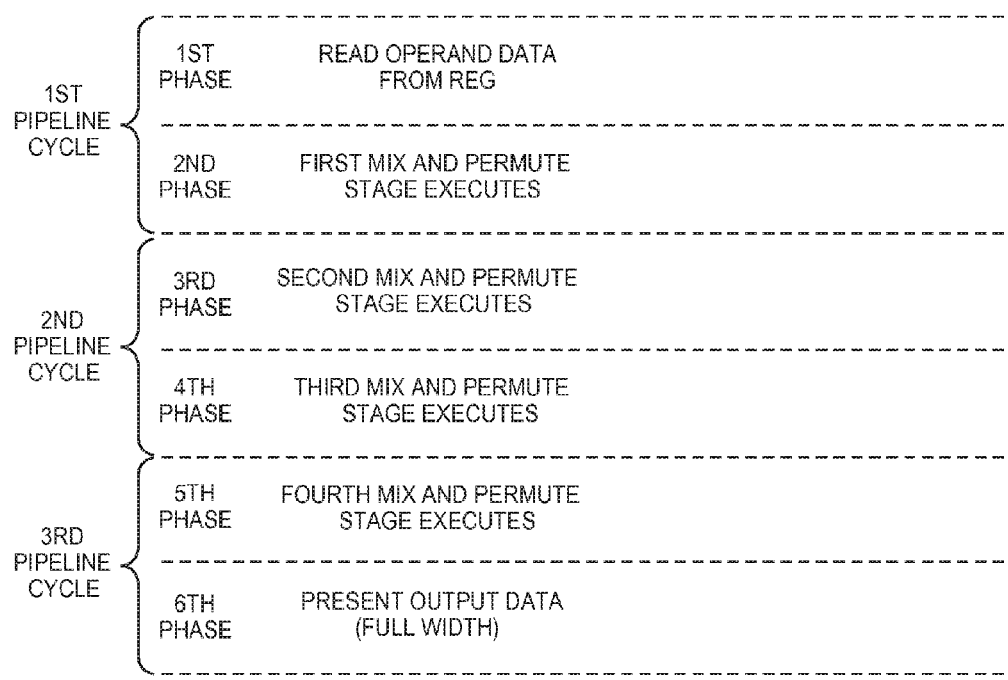
Figure 5B:
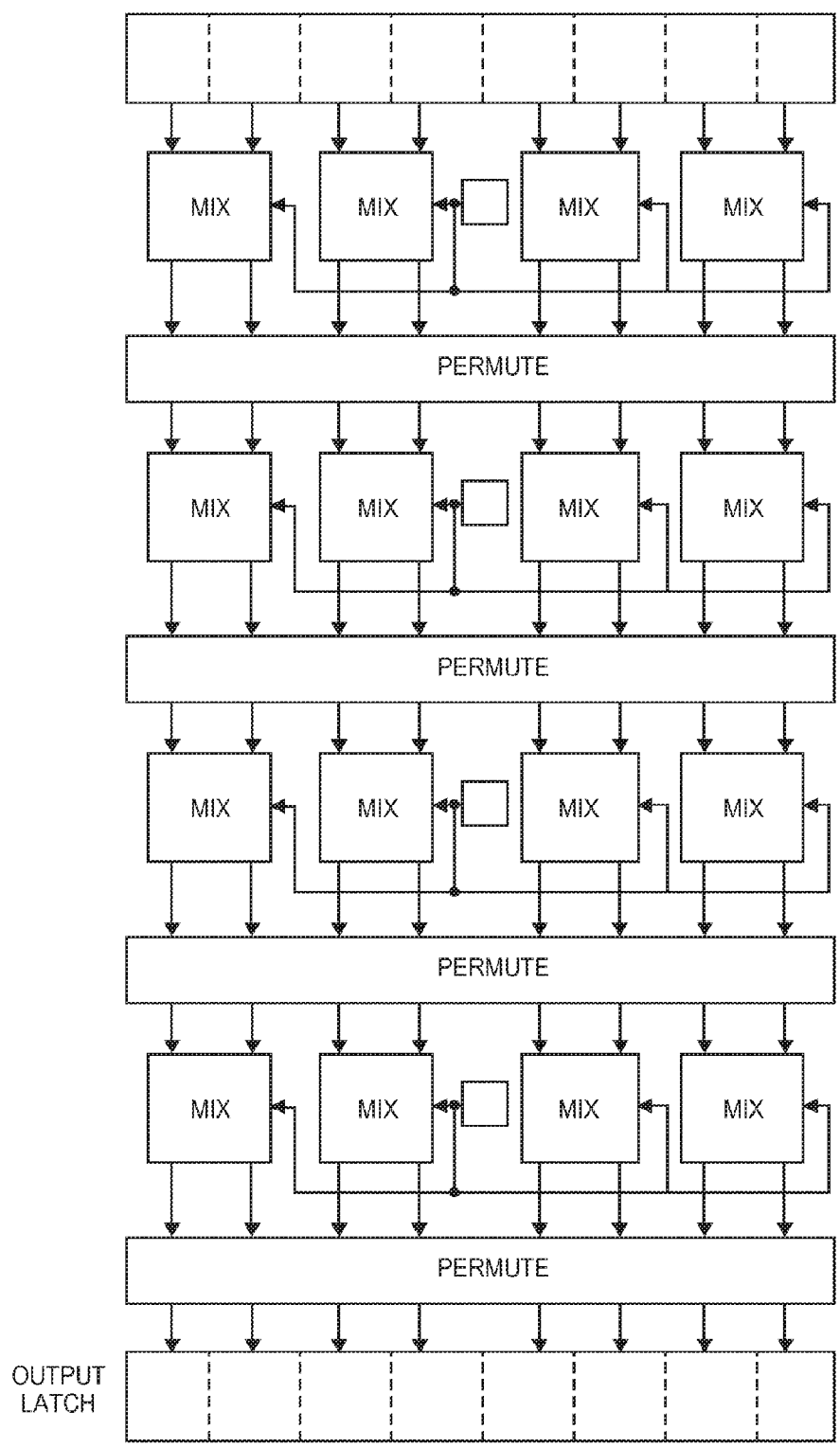
Figure 6B:
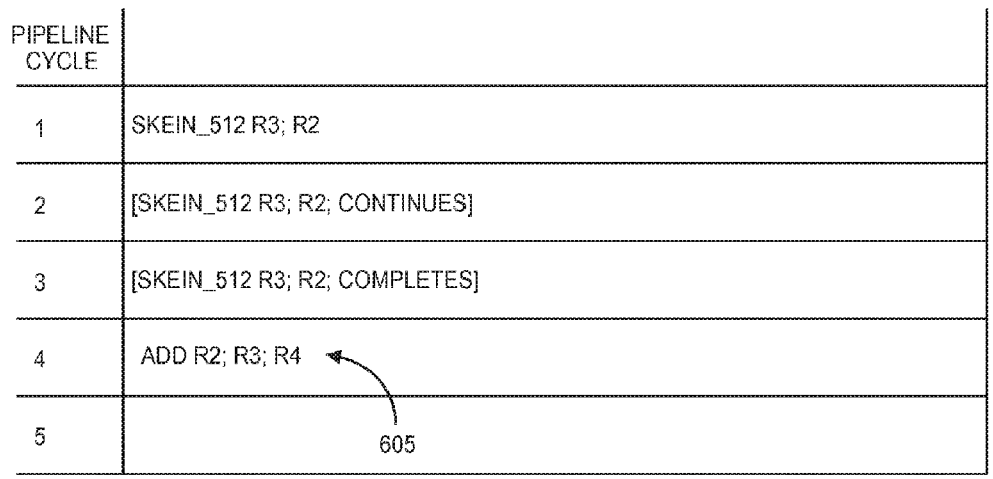

FIGS. 4b, 5b and 6b pertain to another embodiment where 512 bit registers are used. In this case, the entire initial operand data can be fetched from a single register (kept in R2), and, the entire 512 bit resultant for four rounds is presented (in R3) at the third pipeline cycle (sixth instruction cycle). By way of a following, single ADD instruction 605, a 512 bit subkey value (kept in R4) is added to the instruction result to produce the 512 bit internal state through four rounds with subsequent subkey addition. Again, with the understanding that an initial subkey value (subkey 0) should be added to initial operand data, subsequent thereto, the "kernel" observed in FIG. 6b can be repeated/looped 18 times to fully calculate the Skein 512 hash (again, a subkey value move operation into R4 may also be included in the kernel).

A Skein 256 instruction can also be calculated on either of the execution units described above, but, only half of the input register space is utilized. Additional micro-code tables may be included in the ROM to account for different rotation for Skein 256 vs. Skein 512. Additionally, the permute blocks can also be under micro-code control with different tables specifying different permute patterns for Skein 256 and Skein 512). A Skein 1024 instruction can be implemented by expanding the number of mix sections from 8 to sixteen per stage, or, utilizing internal pipelined and/or mix section re-use for execution of a single instruction as described in more detail further below. For an execution that unit that can perform Skein 256, Skein 512 and Skein 1024 operations, microcode tables may be added for rotation and permutation for each of Skein 256, Skein 512 and Skein 1024 instructions.

FIG. 7a shows an instruction phase sequence for computing four rounds of a Skein hash algorithm with a single instruction, SKEIN_512 where the single instruction includes a feedback path and re-uses same mix logic to perform the multiple rounds in the single instruction. Again, a Skein-512 implementation is referred to as an example.

In an embodiment, the instruction is of the form SKEIN_512 R3; R1; R2; imm where R3 is the location of the destination register in vector register space where the resultant of the SKEIN_512 instruction is stored, and, R1 and R2 are input registers that provide the input operands for computation. In a particular embodiment, R1, R2 and R3 are each 256 bit registers. As such, R1 and R2 together correspond to the 512 bits of total input operand data (i.e., 8 quadwords) utilized by a Skein-512 hashing algorithm.

Moreover, with the destination R3 also being only 256 bits wide, the resultant of the instruction can only be a lower half or upper half of the complete 512 bits that are calculated after four rounds of computation (internally, the SKEIN_512 instruction comprehends the full 512 bits of internal state needed to calculate the four rounds). Immediate value imm in the instruction format specifies whether the SKEIN_512 instruction is to provide, after four rounds of calculation, the lower half or upper half of the full 512 bit resultant.

Figure 8A:
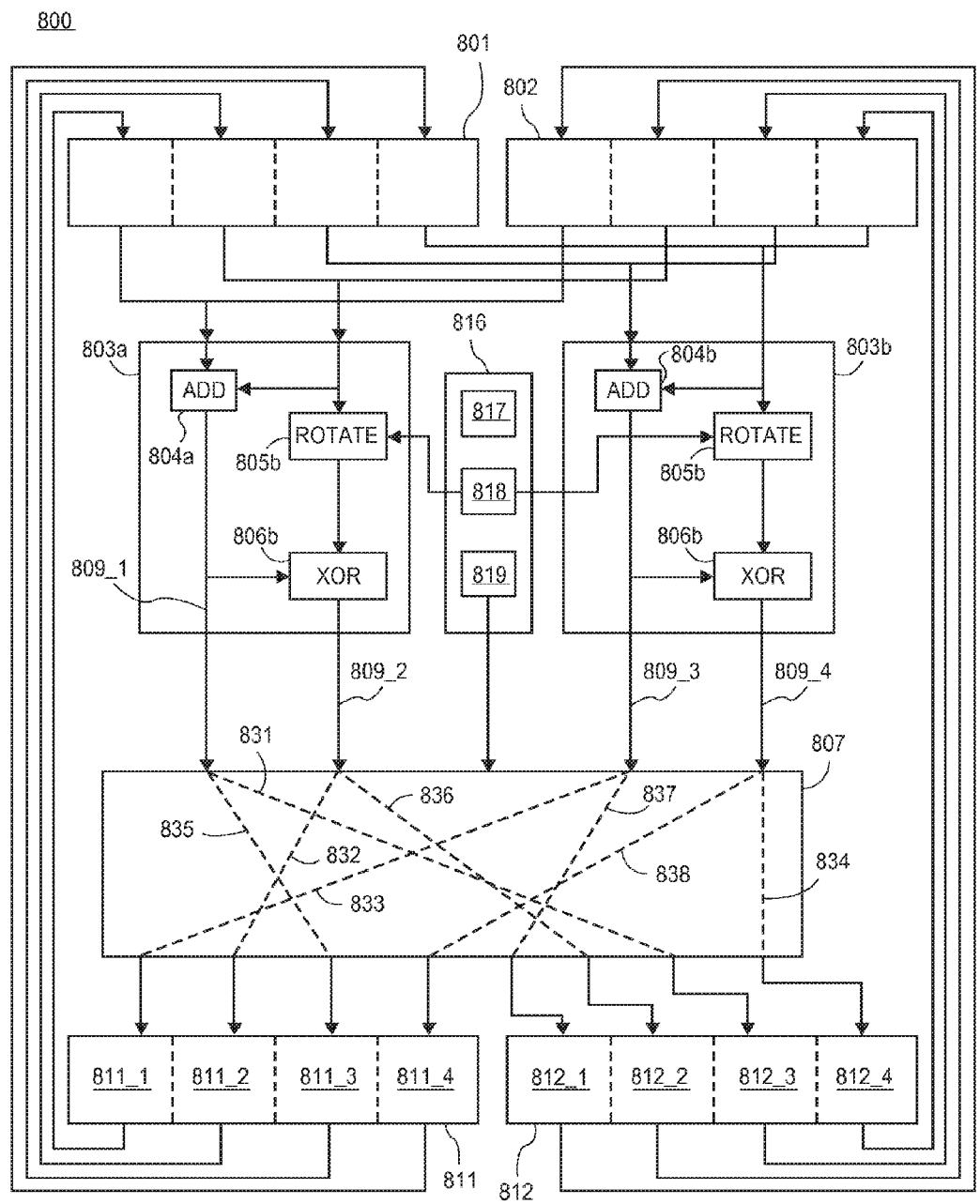
FIGS. 8a through 8c show different execution units for calculating multiple rounds of a Skein hashing algorithm.

FIG. 8a shows an embodiment of the logic design of an execution unit 800 that performs the SKEIN_512 instruction. In an embodiment, referring to FIGS. 7a and 8a, the SKEIN_512 instruction accepts, in a first phase of the SKEIN instruction 701, eight quad words (512 bits) from the R2, R3 vector register space as input operand information and stores the values in local register space 801, 802. Initially, register space 801 holds the four quad words loaded from R2 and register space 802 holds the four quad words loaded from R3.

Thus, register space 801 holds a 256 data bit structure that corresponds to a "left half" of the 512 bit internal state, and, register space 802 holds a 256 data structure that corresponds to a "right half" of the 512 bit internal state. Over the following instruction phases, described in more detail immediately below, the instruction progresses through four rounds of calculations and writes the 256 bit lower or upper half of the result, in accordance with the imm operand, to the 256 bit destination register space R3.

As observed in FIG. 8*a*, the execution unit 800 includes logic sufficient to calculate two mix operations in parallel. That is, the execution unit 800 includes: 1) a first logic section 803*a* having an adder 804*a*, rotator 805*a* and XOR gate 806*a* to perform the computations for a first mix operation on the "left half" of the contents of input registers 801 and 802; and, 2) a second logic section 803*b* that includes an adder 804*b*, rotator 805*b* and XOR gate 806*b* to perform the computations for a second mix operation on the "right half" of the contents of input registers 801, 802. The pair of logic sections 803*a* and 803*b* operate in parallel to simultaneously compute four quadwords (256 bits) as a mix layer output.

Because the full internal state of a Skein-512 algorithm requires eight quadwords (512 bits), and both logic sections 803*a,b* operating in parallel can at most only produce 256 bits of internal state information at a time, execution unit 800 is designed to process the content of the two 256 input operand registers in registers 801, 802 in a pipelined fashion.

That is, in an embodiment, the contents of input register 801 are initially provided to the first and second logic sections 803*a,b* in a second instruction phase 702, then, the contents of input register 802 are provided to the same logic sections 803*a,b* in the same second instruction phase 702.

Over the course of execution of the second phase 702, in response to the presentation of the content of register 801 to logic sections 803*a,b*, the following operations transpire: 1) the left and right quad words that are respectively presented to logic section 803*a* and 803*b* are added; 2) a rotate operation on the right quad word presented to both logic sections 803*a,b* is performed; 3) the result of the addition of 1) above is XORed with the result of the rotate from 2) above; and, 4) the result of the XOR of 4) above is permuted through a permute block 807 and latched into registers 811, 812 at locations (described in more detail further below) that are consistent with a permutation pattern used by the Skein hashing algorithm.

With respect to the final operation 4) described just above, in an embodiment, referring to FIG. 3*c* and FIG. 8*a*, the following permutations are effected for the values that flow from register 801: 1) the left quad word 809_1 at the output of logic 803*a* is permuted 831 to location 812_3 of register 812; 2) the right quad word 809_2 at the output of logic section 803*a* is permuted 832 to location 811_2 of register 811; 3) the left quad word 809_3 at the output of logic section 803*b* is permuted 833 to location 811_1 of register 811; and, 4) the right quad word 809_4 at the output of logic section 802*b* is permuted 834 to location 812_4 of register 812.

Comparing the above discussion with FIG. 3*c*, the reader will recognize that half of the permutation scheme observed in FIG. 3*c* is represented in registers 811 and 812 where register 811 is viewed as a 256 bit register containing the left half of the internal state information, and, register 812 is viewed as a 256 bit register containing the right half of the internal state information.

The second phase 702 can also be pipelined to process the contents of register 802 in the same manner as for the contents of register 801 but in following respective clock cycles and with a different permutation pattern. For instance, upon the contents of register 801 being presented to logic sections 803*a,b* at the start of the second phase 702, and, after an additional number of following clock cycles have passed sufficient for logic sections 803*a,b* to perform their respective operations on the contents of register 801 and have the results permuted into registers 811, 812, the contents of register 802 may be presented to logic sections 803*a,b*.

Again referring to FIG. 3*c* and FIG. 8*a*, the permutation scheme for the add and XOR values calculated from the contents of register 802 are as follows: 1) the left quad word 809_1 at the output of logic 803*a* is permuted 835 to location 811_3 of register 811; 2) the right quad word 809_2 at the output of logic section 803*a* is permuted 836 to location 812_2 of register 812; 3) the left quad word 809_3 at the output of logic section 803*b* is permuted 837 to location 812_1 of register 812; and, 4) the right quad word 809_4 at the output of logic section 802*b* is permuted 838 to location 811_4 of register 811.

The second instruction phase 702 is complete with the add and XOR resultants from the contents of register 802 being permuted and stored in registers 811 and 812. The completion of the second instruction phase 702 corresponds to the completion of the first round, with, the data values for the next round being properly aligned and ready for use in registers 811 and 812.

As such, a third instruction phase 703 commences that sequences through a same set of operations as described above for the second instruction phase. However, the third instruction phase 703 reads input values from register 811 instead of register 801 (but in the same manner as register 801 as described above for the second instruction phase 702). Similarly, the third instruction phase 703 reads input values from register 812 instead of register 802 (but in the same manner as register 802 as described above for the second instruction phase 702). At the completion of the third instruction phase 703 two rounds are complete.

Two more instruction phases, a fourth instruction phase 704 and a fifth instruction phase 705, are performed like the third instruction phase 703 described just above. As such, at the end of the fifth instruction phase 705, the computation of the fifth rounds is complete. In a sixth instruction phase 706, the contents of register 811 or 812, depending on whether the immediate operand in the instruction specifies the lower half or the upper half of the 512 bit resultant, are written to the destination register R3.

In an embodiment, the execution unit 800 is micro-coded and stores, in a read-only-memory (ROM) 816, not only the micro-code 817 that institutes the program flow control through the four loops of the four rounds, but also, keeps control tables 818, 819 for the rotator logic circuits 805*a,b* and permute logic block 807. Here, both the control tables 818, 819 may be implemented as a kind of look up table that looks up a new set of control values with each new round/loop.

That is, with respect to the rotator circuitry 805*a,b* recall from the discussion of FIG. 3*d* that the amount of rotation that is to be performed is a function of the specific round being executed and the position of the quad word within the 8 quad word (512 bit) internal state of the hashing algorithm.

In the design of FIG. 8a, both parameters change for either rotator on a per round basis. That is, each new loop corresponds to a different round, and, the position of the respective words in the internal state also toggles with each round (in the first round, logic section 803a processes the leftmost words and section 803b processes the third and fourth leftmost words, by contrast, in the second round, logic section 803a processes the third and fourth rightmost words and logic section 803b processes the rightmost words).

Similarly, the permutation to take effect on a quad word is also a function of the position of the word in the 512 bit internal state. As such, control values are read from control tables 818, 819 with each loop and are respectively applied to the rotator circuitry 805a,b and permute block 807 to effect the correct rotation and permute for the quad words that are processed through the loop.

Figures 9A, 9B:
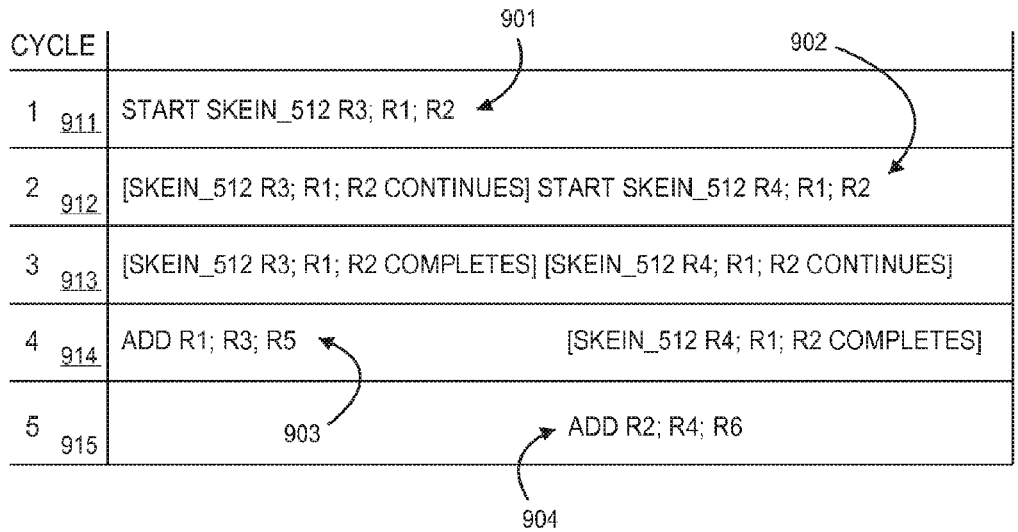

FIG. 9a shows an object code sequence that uses the SKEIN_512 instruction discussed above to compute a complete Skein 512 hash algorithm. As observed in FIG. 9a, a first SKEIN_512 instruction is executed 901 in a first instruction pipeline cycle 911. The immediate operand of the first SKEIN_512 instruction indicates whether the low half or the high half of the 512 bit resultant of the four rounds calculated by the instruction is to be returned. For the sake of example, assume the low half is to be returned.

On a second instruction pipeline cycle 912, a second SKEIN_512 instruction 902 begins to be executed, and, the first SKEIN_512 instruction 901 continues its operation. Here, for the sake of example, assume that there are two instruction phases per instruction pipeline cycle. Recalling that the SKEIN_512 instruction discussed above with respect to FIGS. 7a and 8a consumed six instruction phases, in this example, therefore, the execution of a single SKEIN_512 instruction consumes three instruction pipeline cycles.

In order to execute two SKEIN_512 instructions in parallel as observed in FIG. 9a, two different execution units may be designed with the logic of FIG. 8a. Here, for example, a same pipeline may include two different execution units that each support the SKEIN_512 instruction. Thus a first execution unit in the pipeline will execute the first SKEIN_512 instruction 901, and, a second execution unit will execute the second SKEIN_512 instruction 902. Alternatively, a computing system may include two pipelines coupled to the same register space. Here, a first pipeline may execute the first SKEIN_512 instruction 901 and a second pipeline may execute the second SKEIN_512 instruction 902.

In a third instruction pipeline cycle 913, the first SKEIN_512 instruction completes and writes the lower half of the four rounds calculation into R3, and, the second SKEIN_512 instruction continues calculation across its third and fourth internal phases.

In a fourth instruction pipeline cycle 914, the second SKEIN_512 instruction completes and writes the upper half of the four rounds of calculation into R4. Also, the lower half of the subkey value that is to be added to the 512 bit internal state after the four rounds, which is stored in R5, is added to the resultant of the first SKEIN_512 instruction in R3 by way of ADD instruction 903. The result is stored in R1. Arithmetic flags can be used to handle any carry from the addition that needs to be rippled into the following addition of the upper half components.

In a fifth instruction pipeline cycle 915, another ADD instruction 904 adds the upper half of the upper rounds calculation that is stored in R4 to the upper half of the subkey that is stored in R6. Any carry over from the lower half ADD 903 is also accounted for. The resultant is stored in R2. At this point, the input quadwords for the next calculation of four rounds and following subkey addition are stored in R1 (lower half) an R2 (upper half). Thus, the same sequence of cycles observed in FIG. 9a can be repeated for the calculation of four rounds and following subkey addition using the contents of R1 and R2 again.

The next subkey values may be moved into R5 and R7 between executions of the instruction sequence observed in FIG. 9a to keep usage of the same registers, or, the next instruction sequence can refer to different registers for the next subkey values. The sequence of FIG. 9a can be repeated 18 times to calculate an entire Skein 512 hash value. The initial subkey addition (see, addition 300 of FIG. 3a) is not shown in FIG. 9a. This addition would be accomplished with an add instruction that precedes the first SKEIN_512 instruction used by the program.

Figure 8B:
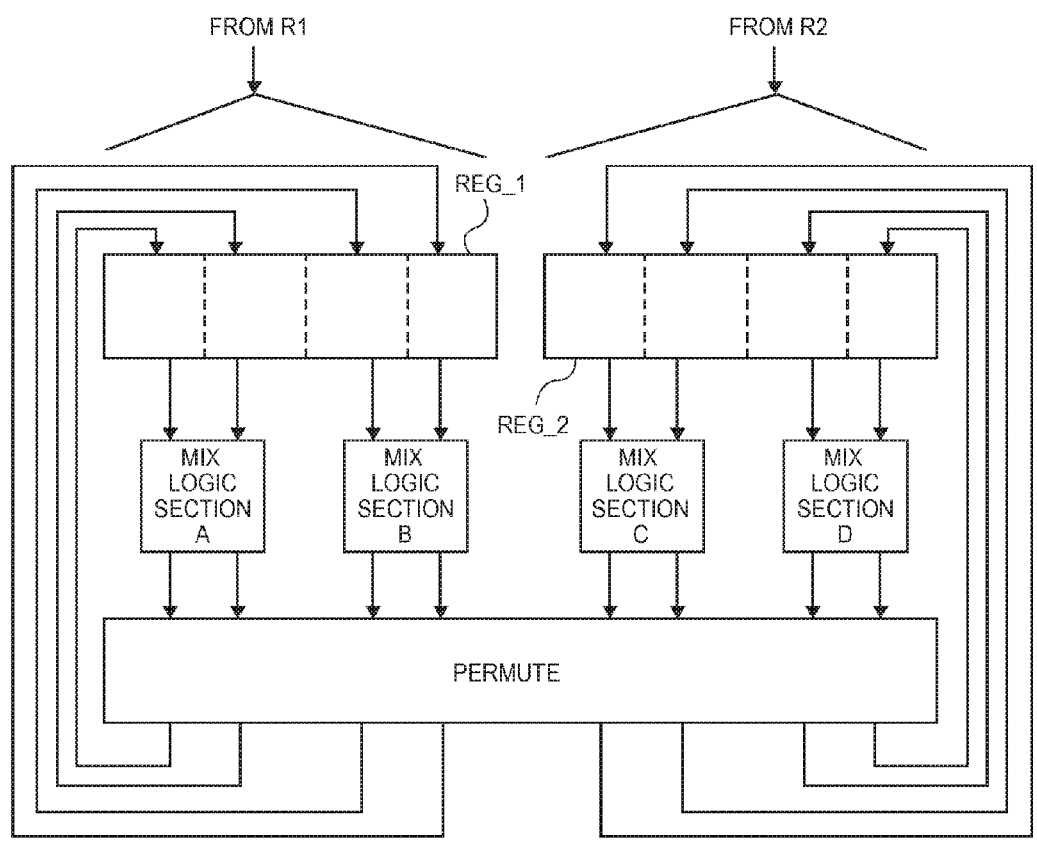

FIGS. 7b, 8b and 9b pertain to another SKEIN_512 instruction design that should be faster than the SKEIN_512 instruction of FIGS. 7a, 8a, 9a. Essentially, the design of the SKEIN_512 instruction includes four mix logic sections A, B, C, D rather than two such sections 803a,b as observed in FIG. 8a so that the calculation of the lower and upper halves of the internal 512 bit state do not have to be calculated in a serial pipelined fashion over the course of calculation of a single round. Rather, the two halves are calculated simultaneously in parallel. As such, the calculation of a single round should consume less clock cycles. Other noticeable differences between the design of FIG. 8a and the design of FIG. 8b are: i) any dependency on quadword location in the 512 bit internal state that could effect the rotator or permute control is no longer applicable because quad words of the same position in the 512 bit state flow through the same mix logic section; and, ii) registers 811 and 812 have been eliminated (the permute block can write to the input registers directly).

As observed in FIG. 9b, if the faster SKEIN_512 instruction of FIG. 8b still consumes three instruction pipeline cycles to complete, the instruction sequence used to effect a calculation of four rounds with subkey addition still follows the same instruction sequence of FIG. 9a owing to the 256 bit register sizes. It is also possible that the SKEIN_512 instruction of FIGS. 7a, 8a, 9a might need four instruction cycles to complete given its longer per round clock cycle consumption. If so, the instruction sequence of FIG. 9a would consume six rather than five instructions to account for the additional pipeline cycle.

Figure 8C:
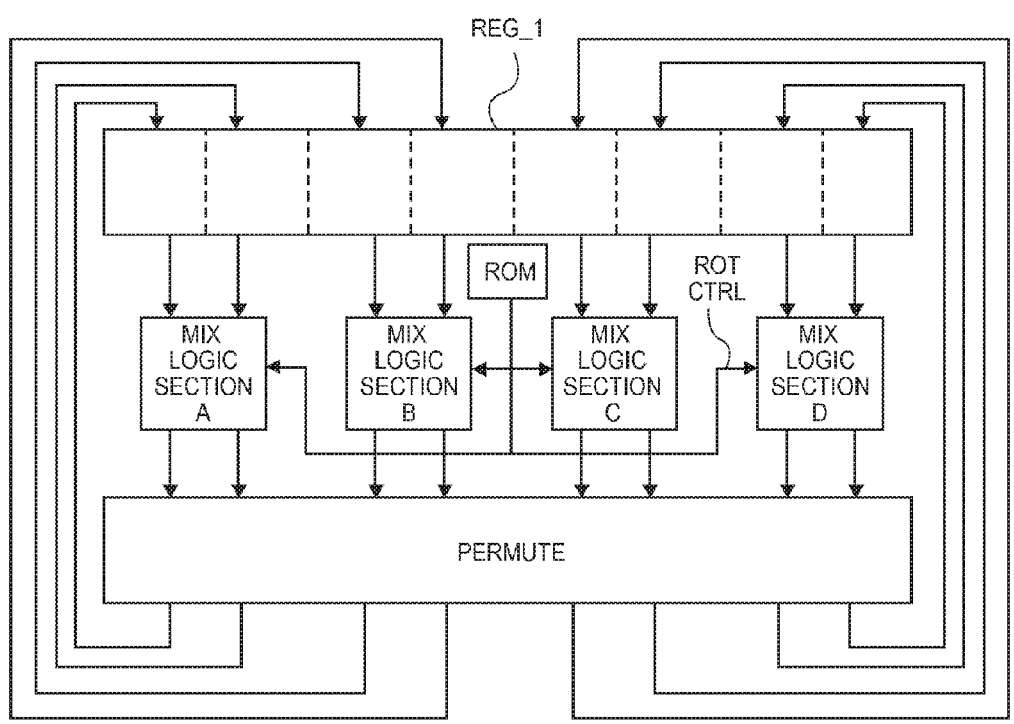

FIGS. 7c, 8c and 9c pertain to a SKEIN_512 instruction that uses 512 bit registers. Here, like the SKEIN_512 instruction of FIG. 8b, the SKEIN_512 instruction of FIG. 8c uses four mix logic units to process all 512 bits of input quadword data in parallel and keep a full 512 bit internal state width. Moreover, because the register size of the machine is also 512 bits and is not restricted to 256 bits, as observed in FIG. 9c, one instruction from the instruction sequence of FIGS. 9a and 9b can be eliminated (again assuming three instruction pipeline cycles are needed to execute the SKEIN_512 instruction) because the complete result of the four rounds of calculation can be written back to a single result register rather than being forced to split the result into two different registers (one for the lower half of the result and another for the upper half of the result). Other than that, the operation of the execution of FIG. 8c is much the same as the execution unit of FIG. 8b.

Additional instructions that calculate Skein 256 and Skein 1024 algorithms may also be implemented. For example, an execution unit that supports a SKEIN_256 instruction may be implemented whose design is very similar to the design of FIG. 8b—except that it uses only one 256 bit input operand register and therefore does not have a second wave of 256 bit wide data to flow through the unit in a serial pipelined fashion to calculate a single round. Likewise, an execution unit that operates much like the execution unit described in FIG. 8a but whose footprint is more similar to the design of FIG. 8c may be implemented to support a SKEIN_1024 instruction. Here, an execution unit used to calculate the SKEIN_1024 instruction would have two 512 bit input operand registers that are calculated serially in a pipelined fashion over the course of a single round (akin to the operation of the execution unit of FIG. 8a). Like the design of the execution unit in FIG. 8c, the SKEIN_1024 instruction unit would have four mix logic sections (but would have a pair of 512 input operand registers rather than a single 512 bit input operand register). An alternative embodiment might strive to have eight mix logic sections that can operate on sixteen quadwords in parallel.

The instructions can be implemented where the data values of the quadwords are expressed as 64 bit integers as opposed to 64 bit floating point values (although floating point values can also be used).

Figure 10:
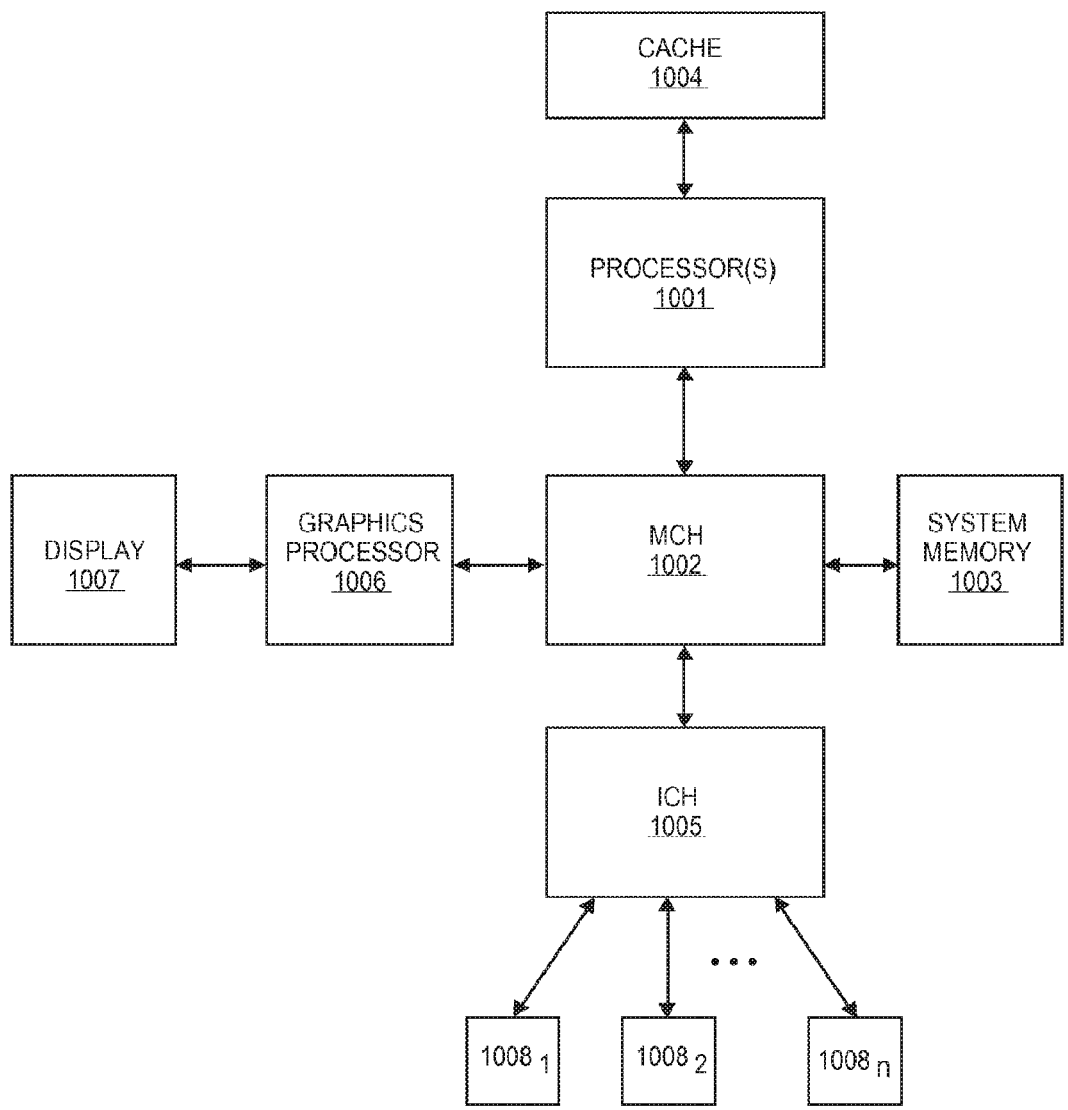
FIG. 10 shows an embodiment of a computing system.

FIG. 10 shows an embodiment of a computing system (e.g., a computer). The exemplary computing system of FIG. 10 includes: 1) one or more processing cores 1001 that may be designed to include two and three register scalar integer and vector instruction execution; 2) a memory control hub (MCH) 1002; 3) a system memory 1003 (of which different types exist such as DDR RAM, EDO RAM, etc,); 4) a cache 1004; 5) an I/O control hub (ICH) 1005; 6) a graphics processor 1006; 7) a display/screen 1007 (of which different types exist such as Cathode Ray Tube (CRT), flat panel, Thin Film Transistor (TFT), Liquid Crystal Display (LCD), DPL, etc.) one or more I/O devices 1008.

The one or more processing cores 1001 execute instructions in order to perform whatever software routines the computing system implements. The instructions frequently involve some sort of operation performed upon data. Both data and instructions are stored in system memory 1003 and cache 1004. Cache 1004 is typically designed to have shorter latency times than system memory 1003. For example, cache 1004 might be integrated onto the same silicon chip(s) as the processor(s) and/or constructed with faster SRAM cells whilst system memory 1003 might be constructed with slower DRAM cells. By tending to store more frequently used instructions and data in the cache 1004 as opposed to the system memory 1003, the overall performance efficiency of the computing system improves.

System memory 1003 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 1003 prior to their being operated upon by the one or more processor(s) 1001 in the implementation of a software program. Similarly, data that a software program determines should be sent from the computing system to an outside entity through one of the computing system interfaces, or stored into an internal storage element, is often temporarily queued in system memory 1003 prior to its being transmitted or stored.

The ICH 1005 is responsible for ensuring that such data is properly passed between the system memory 1003 and its appropriate corresponding computing system interface (and internal storage device if the computing system is so designed). The MCH 1002 is responsible for managing the various contending requests for system memory 1003 access amongst the processor(s) 1001, interfaces and internal storage elements that may proximately arise in time with respect to one another.

One or more I/O devices 1008 are also implemented in a typical computing system. I/O devices generally are responsible for transferring data to and/or from the computing system (e.g., a networking adapter); or, for large scale non-volatile storage within the computing system (e.g., hard disk drive). ICH 1005 has bi-directional point-to-point links between itself and the observed I/O devices 1008.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion, etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.) or may be compiled directly into object code.

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

In the foregoing specification, the invention has been described with reference to specific exemplary embodiments thereof. It will, however, be evident that various modifications and changes may be made thereto without departing from the broader spirit and scope of the invention as set forth in the appended claims.

What is claimed is:

1. A hardware processor comprising:
multiple mix logic circuitry sections arranged in parallel and each section comprising:
a first input to receive a first value and a second input to receive a second value, and
a first output and a second output to output a first result and a second result of a mix operation on the first value and the second value according to a hashing algorithm;
permute logic circuitry including parallel inputs coupled to the first and second outputs of each section of the multiple mix logic circuitry to simultaneously receive the first result and the second result from the each section without passage through an additional mix logic circuitry section, and a plurality of parallel output sets, each set to output results of a permute operation on the first result and the second result from a corresponding section according to the hashing algorithm; and
control circuitry to couple a first output and a second output of each set to the first input and the second input of each corresponding section of the multiple mix logic circuitry sections, without passage through an additional mix logic circuitry section, wherein the multiple mix logic circuitry sections and permute logic circuitry calculate a hash output value based on input operand data, the first and second results from each section, and the results of the permute operation using less clock cycles in response to the parallel arrangement than otherwise using a serial pipelined arrangement.

2. The hardware processor of claim 1, wherein the control circuitry comprises a set of control values for the multiple mix logic circuitry sections and the permute logic circuitry for each of multiple rounds of execution through the multiple mix logic circuitry sections and the permute logic circuitry according to the hashing algorithm.

3. The hardware processor of claim 2, wherein the control circuitry comprises a look up table to look up a new, different set of control values for each round of the multiple rounds of execution according to the hashing algorithm.

4. The hardware processor of claim 1, wherein the control circuitry comprises a set of control values for the multiple mix logic circuitry sections for each of multiple rounds of execution through the multiple mix logic circuitry sections according to the hashing algorithm.

5. The hardware processor of claim 1, wherein the control circuitry comprises a set of control values for the permute logic circuitry for each of multiple rounds of execution through the permute logic circuitry according to the hashing algorithm.

6. The hardware processor of claim 1, wherein the control circuitry is to provide a set of control values to a rotator in each multiple mix logic circuitry section for each round of execution through the multiple mix logic circuitry sections.

7. The hardware processor of claim 1, wherein the hashing algorithm is a Skein hashing algorithm.

8. A method comprising:
performing the following with each section of multiple mix logic circuitry sections arranged in parallel:
receiving a first value with a first input and a second value with a second input, and
performing a mix operation according to a hashing algorithm on the first value and the second value to output a first result and a second result;
coupling parallel inputs of permute logic circuitry to outputs of each section of the multiple mix logic circuitry sections to simultaneously receive the first result and the second result from the each section without passage through an additional mix logic circuitry section;
performing a permute operation according to the hashing algorithm on the first result and the second result from each section to output results from each set of a plurality of parallel output sets of the permute logic circuitry; and
coupling a first output and a second output of each set to the first input and the second input of each corresponding section of the multiple mix logic circuitry sections with control circuitry, without passage through an additional mix logic circuitry section, wherein the multiple mix logic circuitry sections and permute logic circuitry calculate a hash output value based on input operand data, the first and second results from each section, and the results of the permute operation using less clock cycles in response to the parallel arrangement than otherwise using a serial pipelined arrangement.

9. The method of claim 8, further comprising providing, with the control circuitry, a set of control values for the multiple mix logic circuitry sections and the permute logic circuitry for each of multiple rounds of execution through the multiple mix logic circuitry sections and the permute logic circuitry according to the hashing algorithm.

10. The method of claim 9, wherein the providing comprises the control circuitry performing a look up in a look up table for a new, different set of control values for each round of the multiple rounds of execution according to the hashing algorithm.

11. The method of claim 8, further comprising providing, with the control circuitry, a set of control values for the multiple mix logic circuitry sections for each of multiple rounds of execution through the multiple mix logic circuitry sections according to the hashing algorithm.

12. The method of claim 8, further comprising providing, with the control circuitry, a set of control values for the permute logic circuitry for each of multiple rounds of execution through the permute logic circuitry according to the hashing algorithm.

13. The method of claim 8, further comprising providing, with the control circuitry, a set of control values to a rotator in each multiple mix logic circuitry section for each round of execution through the multiple mix logic circuitry sections.

14. The method of claim 8, wherein the hashing algorithm is a Skein hashing algorithm.

15. A non-transitory machine readable medium that stores code that when executed by a machine causes the machine to perform a method comprising:
performing the following with each section of multiple mix logic circuitry sections arranged in parallel:
receiving a first value with a first input and a second value with a second input, and
performing a mix operation according to a hashing algorithm on the first value and the second value to output a first result and a second result;
coupling parallel inputs of permute logic circuitry to outputs of each section of the multiple mix logic circuitry sections to simultaneously receive the first result and the second result from the each section without passage through an additional mix logic circuitry section;

performing a permute operation according to the hashing algorithm on the first result and the second result from each section to output results from each set of a plurality of parallel output sets of the permute logic circuitry; and coupling a first output and a second output of each set to the first input and the second input of each corresponding section of the multiple mix logic circuitry sections with control circuitry, without passage through an additional mix logic circuitry section, wherein the multiple mix logic circuitry sections and permute logic circuitry calculate a hash output value based on input operand data, the first and second results from each section, and the results of the permute operation using less clock cycles in response to the parallel arrangement than otherwise using a serial pipelined arrangement.

16. The non-transitory machine readable medium of claim 15, wherein the method further comprises providing, with the control circuitry, a set of control values for the multiple mix logic circuitry sections and the permute logic circuitry for each of multiple rounds of execution through the multiple mix logic circuitry sections and the permute logic circuitry according to the hashing algorithm.

17. The non-transitory machine readable medium of claim 16, wherein the providing comprises the control circuitry performing a look up in a look up table for a new, different set of control values for each round of the multiple rounds of execution according to the hashing algorithm.

18. The non-transitory machine readable medium of claim 15, wherein the method further comprises providing, with the control circuitry, a set of control values for the multiple mix logic circuitry sections for each of multiple rounds of execution through the multiple mix logic circuitry sections according to the hashing algorithm.

19. The non-transitory machine readable medium of claim 15, wherein the method further comprises providing, with the control circuitry, a set of control values for the permute logic circuitry for each of multiple rounds of execution through the permute logic circuitry according to the hashing algorithm.

20. The non-transitory machine readable medium of claim 15, wherein the method further comprises providing, with the control circuitry, a set of control values to a rotator in each multiple mix logic circuitry section for each round of execution through the multiple mix logic circuitry sections.

21. The non-transitory machine readable medium of claim 15, wherein the hashing algorithm is a Skein hashing algorithm.

* * * * *